United States Patent [19]

Weimar

[11] Patent Number: 4,542,610
[45] Date of Patent: Sep. 24, 1985

[54] FINISHING OR SEALING STRIPS

[75] Inventor: Erich Weimar, Viersen, Fed. Rep. of Germany

[73] Assignee: Draftex Development A.G., Zug, Switzerland

[21] Appl. No.: 536,329

[22] Filed: Sep. 27, 1983

[30] Foreign Application Priority Data

Oct. 2, 1982 [GB] United Kingdom ............... 8228227

[51] Int. Cl.⁴ .............................................. E06B 7/16
[52] U.S. Cl. ..................................................... 49/491
[58] Field of Search ........................... 49/490, 491, 485

[56] References Cited

U.S. PATENT DOCUMENTS 3,793,772  2/1974  Kouth .................................. 49/490

FOREIGN PATENT DOCUMENTS

| 3048743 | 12/1980 | Fed. Rep. of Germany ........ 49/490 |
| 1519307 | 2/1968 | France ................................. 49/491 |
| 992673 | 5/1965 | United Kingdom .................. 49/491 |
| 1405014 | 9/1975 | United Kingdom . |
| 2022180B | 5/1979 | United Kingdom . |
| 1556655 | 11/1979 | United Kingdom . |
| 2032500 | 5/1980 | United Kingdom . |
| 2045322 | 10/1980 | United Kingdom . |
| 1579727 | 11/1980 | United Kingdom . |
| 2062733 | 5/1981 | United Kingdom . |
| 1597127 | 9/1981 | United Kingdom . |
| 2086459 | 5/1982 | United Kingdom . |
| 2088456 | 6/1982 | United Kingdom . |

Primary Examiner—Kenneth Downey
Attorney, Agent, or Firm—Leydig, Voit & Mayer, Ltd.

[57] ABSTRACT

A sealing or trimming strip has a gripping section and a sealing section and is formed into an open or a closed ring for mounting on a flange running around an opening in a vehicle body. The resilient plastics or rubber material of the gripping section is formed to provide a hollow tube in to which an insert of hardened metal wire may be placed. The wire, which may extend completely around the ring or which may be in the form of separate end-shaped lengths, stiffens the strip and enables it to hold a desired 'set' or shape, but does not prevent the strip from being compressed longitudinally to the extent which may be permitted by any reinforcing metal carrier (if provided).

9 Claims, 10 Drawing Figures

FINISHING OR SEALING STRIPS

BACKGROUND OF THE INVENTION

The invention relates to channel-shaped finishing or sealing strips particularly though not exclusively for use on vehicle bodies such as for covering bodywork flanges running around openings (e.g. door or luggage compartment openings) or for window glass receiving purposes. When used on bodywork flanges, such a strip may carry a soft seal running along its outside surface and so positioned that, when the strip is mounted on the flange, a door of the body opening closes onto the seal to prevent entry of draughts and water. However, it should be understood that the invention is not limited to strips for use on vehicle bodies.

BRIEF SUMMARY OF THE INVENTION

According to the invention, there is provided a channel-shaped finishing or sealing strip made with channel-shaped resilient material which is stiffened by at least one longitudinally extending continuous spring-like member.

According to the invention, there is also provided a channel-shaped finishing or sealing strip made with channel-shaped resilient material which incorporates at least one longitudinally extending relatively stiff wire-like insert extending along at least part of its length.

According to the invention, there is also provided a channel-shaped finishing or sealing strip formed into a completely closed, or open, ring, with the mouth of the channel facing outwardly thereof and sized so as embracingly to fit onto a flange running around a door opening of a vehicle body, the resilient material defining at least one hollow tubular bore running along its length, and an insert of hardened metal wire in the tubular bore and extending along at least part of its length and being a relatively loose fit therein.

DESCRIPTION OF THE DRAWINGS

Finishing and sealing strips embodying the invention will now be described, by way of example only, with reference to the accompanying diagrammatic drawings in which.

DESCRIPTION OF THE PREFERRED EMBODIMENTS

Figure 1:
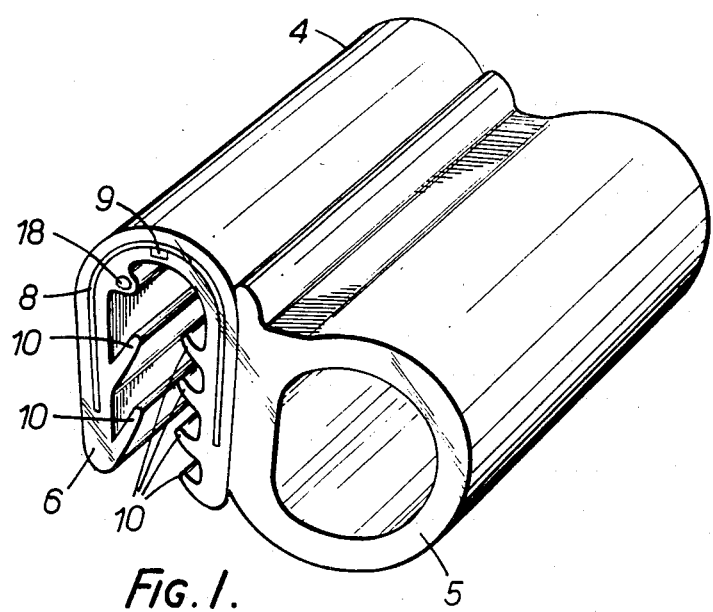
FIG. 1 is a perspective view of part of one of the strips.

As shown in FIG. 1, the channel-shaped sealing or finishing strip comprises a gripping portion 4 and a sealing portion 5. The gripping portion 4 is made of channel-shaped resilient material 6 such as plastics or rubber material in which is embedded a reinforcing metal carrier 8. The carrier 8 is preferably made of metal and may take any suitable form, such as made of U-shaped wire elements arranged side-by-side to define a channel and interconnected with each other or completely disconnected. Instead, however, it may be made of wire looped to and fro around the channel. However, particularly advantageous forms of carrier are shown in British Patent Specifications Nos. 1598683 and 2032500. This form of carrier is made of U-form metal elements which are arranged side-by-side to define the channel, each leg of each element being connected to the legs of the adjacent elements by integral connecting links which are slanted with respect to the direction of extension of the legs. Such a carrier has the advantage that it may be compressed lengthwise to a limited but significant extent, thus permitting lengthwise compression of the sealing or finishing strip for a purpose to be described. A sealing or finishing strip incorporating this form of carrier advantageously also incorporates a thin tape 9 of substantially inextensible material which runs along the length of the strip and is embedded within the resilient material 8. In this way, therefore, although the finished strip may be compressed lengthwise slightly, it is made substantially non-stretchable.

The material 8 is formed to provide gripping lips 10, which run along the inside walls of the channel. As shown, there are four relatively small gripping lips on one side wall of the channel and two relatively larger gripping lips on the other side wall. However, there may be more, less, or no, gripping lips on one or both inside walls of the channel, and there need not be equal numbers on the two sides. The gripping lips 10 need not have the same hardness as each other or as the material 6.

The material 6, together with the material of the gripping lips 10, may be extruded simultaneously over the metal carrier 8 using known extruding processes.

The sealing section 5 is preferably made of soft resilient material such as of foamed or expanded consistency, such as rubber or plastics. It may be produced separately and then attached to the gripping section 4, as by means of adhesive. Instead, however, it may be extruded simultaneously with the material 6 (but not necessarily of the same hardness or consistency).

Figure 2:
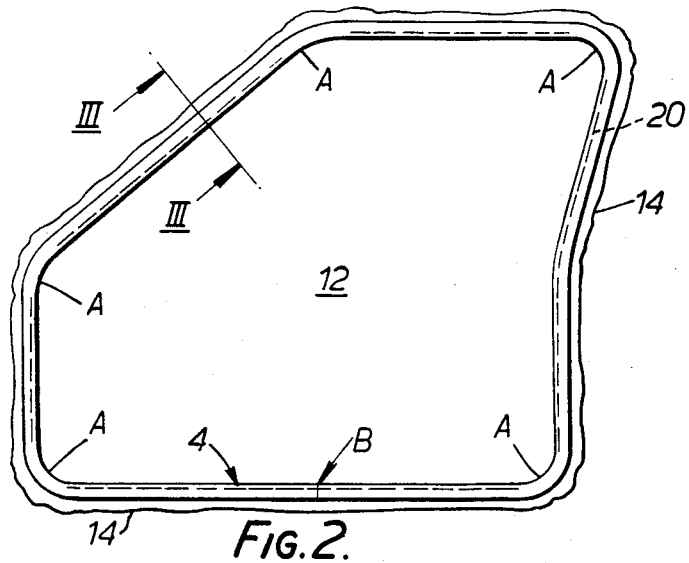
FIG. 2 shows the strip of FIG. 1 formed into a ring which is fitted onto the flange running around the door opening of a vehicle body.
Figure 3:
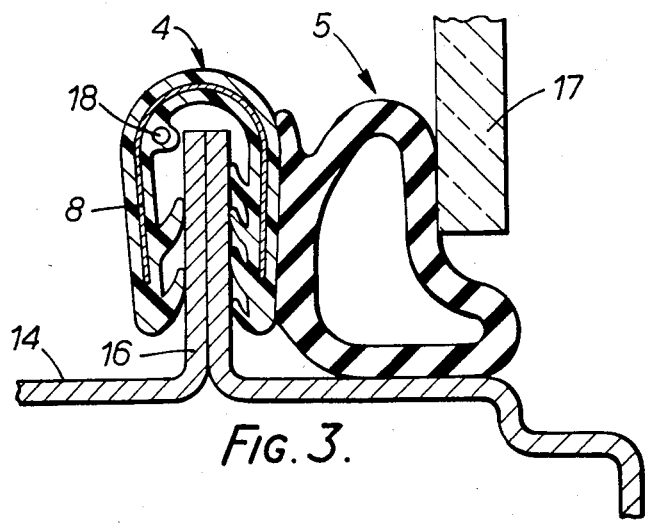
FIG. 3 is a cross-section on the line III—III of FIG. 2.

FIG. 2 shows the door opening 12 of a vehicle body opening 14. The metal of the vehicle body 14 defines a flanged joint 16 (shown in FIG. 3) between the inner and outer part of the body at the door opening, and this flanged joint 16 runs around the periphery of the door opening 12, within its plane and extending towards the centre of the opening. In use, the strip is placed over, and grippingly embraces, the flange 16. As shown in FIG. 3, the lips 10 make contact with the sides of the flange and provide a sealing and gripping function, and the strip is so mounted that the sealing part 5 extends around the outside of the periphery of the openings. When the door 17 of the opening closes, it closes onto the sealing section 5 which is thus compressed to provide a weatherproof seal.

In accordance with a particular feature of the sealing strip being described, the resilient material 6 is formed with a small hollow tubular bore 18 which extends along the complete length, preferably, of the material and may be formed during the extrusion process. The bore 18 is for receiving a hardened metal wire indicated diagrammatically in dotted form at 20 in FIG. 2 (but not shown in FIGS. 1 and 3). The metal wire is inserted into the bore 18 and is preferably a relatively loose fit within the bore 18; that is, it may be of such size that it makes contact with the wall of the bore 18 but the material is not significantly stretched when the wire is inserted.

One of the purposes of the wire insert is to enable the sealing strip to be stiffened but without the use of a relatively stiff metal carrier. If the strip is manufactured in a complete ring (as shown in FIG. 2), so sized as to suit a particular vehicle door opening for example, the wire enables the ring to be shaped to suit the shape of the door opening and to hold itself in that shape. Therefore, the metal carrier 8 does not have to be stiff to ensure this. The use of a stiff metal carrier is disadvantageous because such a metal carrier may reduce the ability of the strip to be bent round curves or corners (such as at A, FIG. 2) and may also have reduced resiliency, thus reducing the extent to which it helps the gripping section to grip the flange 16.

The use of the wire 20, to hold the sealing strip into a ring of pre-formed shape, is advantageous for use in conjunction with robot assembly machinery (for automatically mounting the strip in position on the vehicle body).

It will be appreciated that, although the wire 20 enables the strip to be given a desired shape, it does not prevent bending of the strip during assembly (whether by a robot or by a fitter). During assembly, the strip can be bent inwardly of the ring (e.g. at the mid point of each straight portion thereof) so as to reduce its effective size, enabling it to be positioned within the door opening and then allowed to spring outwardly, under the influence of the resilience of the wire 20, so that the gripping portion 4 embraces the flange 16. If the tape 9 (FIGS. 1 and 3) is positioned in the inverted base of the channel (instead of along one of the channel sides as shown), the outward springing of the strip is assisted.

In accordance with an important feature, however, the wire 20 does not necessarily extend continuously around the ring. In fact, it is advantageously in the form of separate lengths, such as each extending along a respective relatively straight portion of the ring, there being gaps of 40 mm, say, between adjacent ends of successive wire inserts, these gaps being advantageously positioned at the points where bends or curves are to be made in the ring. Even though the wire is no longer continuous, the separate lengths of wire still serve to hold the ring in its pre-formed shape.

One advantage of using discontinuous lengths of wire is that it enables the total peripheral length of the ring to be reduced slightly, by longitudinally compressing it. As already explained, such longitudinal compressing is permitted by the form of the carrier 8 which is advantageously used, and the wire 20, being discontinuous, does not prevent compression either, such compression being further facilitated by the fact that the wire can move longitudinally within the bore 18. In this way, therefore, the ring can be compressed so as to take account of tolerances in the peripheral length of the flange 16. However, the provision of the substantially inextensible tape 9 prevents the strip from being inadvertently stretched to any significant extent. In the absence of the tape, it could be that the strip might be inadvertently stretched, during handling, and this is undesirable, because it may prevent the strip fitting properly; and subsequent lengthwise resiling of the strip, which may take place over an extended period of time, could cause the strip to move on the flange and again might present an unsightly appearance.

The wire of the insert or inserts 20 is hardened or otherwise processed so as to be spring-like when bent to not more than a certain extent but if bent more than that extent, it retains the shape into which it may be set. This also enables the gripping section 4 to be curved in a plane at right angles to the plane of the opening 12 so as to match the curves in the side or other part of the vehicle body of which the opening 12 forms part. The wire maybe 2 mm in diameter, for example.

Although reference has been made above to a ring, implying that the strip is formed into a continuous ring, it is not necessary for the ring to be continuous; it may be discontinuous, with the disconnected ends abutting against each other as shown at B or possibly with these ends spaced slightly apart and covered with a clipped-over trim piece.

When the ring is continuous, it will be made up of a length of strip which is cut to the correct length, then joined by adhesive or by the application of heat. This process can be facilitated by the use of the wire insert or inserts 20, because part of the insert can be arranged to project slightly out of one of the ends to be joined so as to insert into the bore 18 of the other end and thus hold the two ends together during the joining process.

The wire insert or inserts 20 may be inserted by temporarily bending the gripping section 4 and making a cut or slip through the bent resilient material 6 so as to cut through the bore 18 and to expose the tube-into which the wire insert or inserts may then be pushed.

Figure 4:
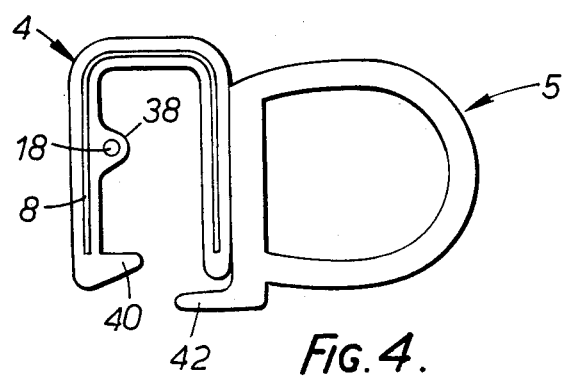
FIG. 4 is an end view of a modified form of strip.
Figure 5:
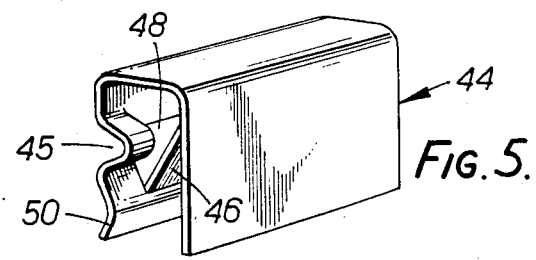
FIG. 5 is a perspective view of a clip which may be used to help attach the strip of FIG. 4 to a flange.
Figure 6:
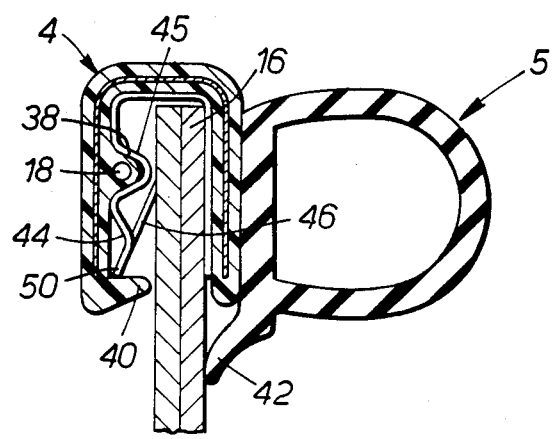
FIG. 6 is a view corresponding generally to FIG. 3 but showing use of the modified strip of FIG. 4.

FIGS. 4, 5 and 6 illustrate an alternative form of strip and how it may be fitted to the flange 16. Parts in these Figures corresponding to parts in the other Figures are similarly referenced.

The strip of FIG. 4 is generally similar to that of FIG. 1 but omits the lips 10. Instead it has a retaining lip 40 and the sealing section 5 also has an inwardly projecting lip 42. The material 6 of the gripping section 4 is extruded so as to have a bulge 38 defining the tubular bore 18 (for receiving the wire insert or inserts 20) at the side of the channel.

Because the strip of FIG. 4 does not have the lips 10 of FIG. 1, it can be more easily fitted on to the flange 16 and is thus particularly suited to mechanical fitting as by a robot. However, the absence of the lips 10 means that it is less able to retain itself on the flange. Therefore, clips 44 (FIG. 5), made of metal preferably, or possibly of stiff plastics material, may be provided and clipped on to the flange 16 at intervals around the opening 12 (see FIG. 2). Each clip is shaped with a re-entrant portion 45 and formed with an inwardly directed leaf 46 (which may be pressed out of the side of the clip so as to leave an opening 48). The clip also has an outwardly extending edge 50.

As shown in FIG. 6, each clip 44 holds itself in position on the flange 16 by its inherent springiness and by virture of the side force exerted by the leaf 46.

When the strip of FIG. 4 is placed on to the flange 16 and over the clips 44, the bulge defining the tubular bore 18 fits into the re-entrant portion 45 of each clip 44 and the lip 40 on the gripping portion 4 fits under the projecting edge 50 of each clip 44 so that the strip is securely held in position. The lip 40 also performs a sealing function, and a sealing function is provided on the other side of the flange 16 by the sealing lip 42.

It will be appreciated that the clips 44 can be of any other convenient shape.

The tubular bore 18, for receiving the wire insert or inserts 20, can be positioned at any other desired position, and the clips 44 modified accordingly.

Figure 7:
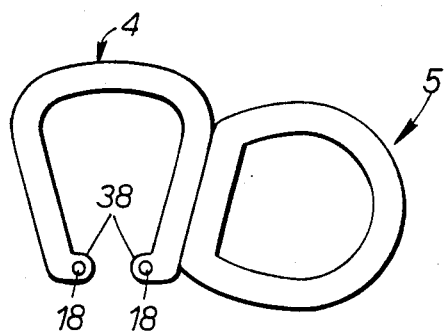
FIG. 7 is an end view of another modified form of strip.

FIG. 7 shows an alternative form in which items corresponding to FIG. 1 are correspondingly referenced. The strip of FIG. 4 differs from that of FIG. 1 in that it has no carrier 8 at all. It is found that the provision of the wire inserts 20 in the bores 18 may enable the carrier to be dispensed with, the strip being held in position on the flange 16 by virtue of its being held in the general shape of the opening 12 by the wire insert or inserts.

As shown in FIG. 7, the gripping section 4 is formed with two bores 18, at the distal edges of the strips, each for receiving a wire insert or inserts 20. However, the bore or bores 18 may be positioned at any convenient alternative position or positions. If desired, the strip of FIG. 7 may be used in conjunction with clips 51 (FIG. 8), formed of resilient metal or plastics, which are fitted on the flange 16 at intervals therealong in the manner already explained with reference to FIGS. 5 and 6. The strip of FIG. 7 is then placed over the flange 16 and over the clips 51, and the bulges 38 on the gripping section 4 defining the bores 18 clip under leaves 52 provided on the clips 51 so as to hold the strip in position and carry out a sealing function.

In any of the strips described, the bores 18 for receiving the wire inserts 20 can be positioned in any other desired positions. They may advantageously be positioned so as to control the neutral bending axis of the strip.

Figure 8:
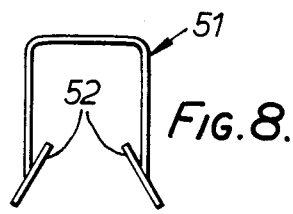
FIG. 8 is an end view of a clip which may be used with the strip of FIG. 7.

The clips 40 and 51 illustrated in FIGS. 6 and 8 may advantageously be coated with plastics or other material to increase their grip on the flange 16 and/or to protect them from corrosion. In a modification the gripping section 4 (e.g. a in FIG. 1) may have two bores 18, parallel to each other and possibly immediately adjacent, so that wire inserts may be provided which overlap over a portion of the ring giving an increased spring effect but still allowing compressibility.

Figure 9:
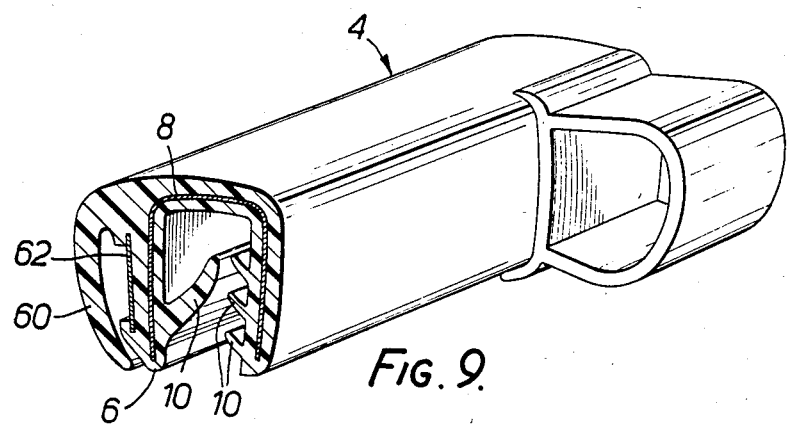
FIG. 9 is a perspective end view of a further modified form of strip.
Figure 10:
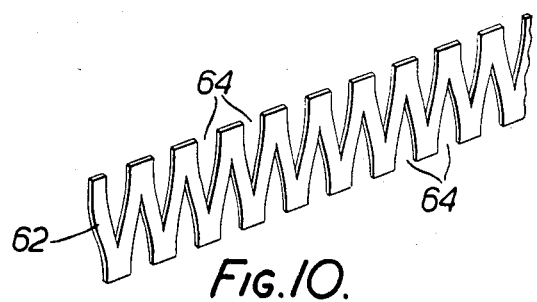
FIG. 10 is a perspective side view of a spring-like member used in the strip of FIG. 9.

FIGS. 9 and 10 how a further modified form of the strip in which parts corresponding to those in other Figures are similarly referenced. The strip of FIG. 9 has its resilient material 6 extruded to define a longitudinal lip 60. In use, when the strip is in position on the door flange 16, this lip 60 runs along the inside of the vehicle and can be suitably coloured or decorated.

The strip of FIG. 9 does not have the bore 18 and the wire 20 but instead has a flat strip 62 attached (e.g. by adhesive) to the outside of the channel-shaped material 6 so as to be covered over by the lip 60, the strip 62 advantageously being located in a recess as shown. As shown in FIG. 10, the flat strip 62 is provided with slits 64 each of which extends across the width of the strip from one edge to stop short of the other edge, with adjacent slits starting at opposite edges. These slits enable the strip 62 to bend (such as to produce the curves in a complete loop as shown in FIG. 2 and/or to enable the strip to be fitted on to the flange in the manner already explained), but also ensure that it retains sufficient spring-like qualities.

The strip 62 may be made of hard rubber, plastics or metal. If it is made of plastics, it may be given a "set" (for the purposes explained above) by subjecting it to heat treatment.

The flat strip 62 need not be positioned as shown in FIG. 9 but may be positioned elsewhere. It may for example be inserted within the resilient material 6.

The arrangements described with reference to FIGS. 1 to 8 may incorporate one or more strips 62 instead of the wire 20.

What is claimed is:

1. A channel-shaped finished or sealing strip, comprising
channel-shaped resilient material, a reinforcing channel-shaped carrier embedded within and running along the length of the resilient material, and
at least one longitudinally extending continuous member of wire form made of metal and which is spring-like but capable of taking a set when bent sufficiently and is fitted in a bore defined in the resilient material.

2. A strip according to claim 1, and including a sealing section made of soft sealing material running along one outside wall of the channel.

3. A channel-shaped finishing or sealing strip comprising
channel-shaped resilient material,
a reinforcing channel-shaped carrier embedded within and running along the length of the resilient material, and
at least one longitudinally extending relatively stiff wire-like insert extending along at least part of the length of a tubular bore defined in the resilient material, the wire-like insert being made of such material and/or so treated that it retains the shape of a bend into which the strip may be formed and is a relatively loose fit in the said tubular bore.

4. A strip according to claim 3, in which the insert is made of hardened metal wire.

5. A strip according to claim 3, in which the carrier is substantially inextensible lengthwise but is compressible to a limited predetermined extent.

6. A strip according to claim 3, in which the resilient material defines, on each inside facing wall of the channel, at least one lip running along the length of the channel and extending partway across the width of the channel for making sealing and gripping contact with the said flange.

7. A strip according to claim 6, in which there is a plurality of such lips on each said wall.

8. A channel-shaped finishing or sealing strip formed into a ring, with the mouth of the channel facing outwardly thereof and sized so as embracingly to fit onto a flange running around a door opening of a vehicle body, the strip comprising
resilient material defining at least one hollow tubular bore running along its length and of channel shape,
a channel-shaped resilient metal carrier embedded within the resilient material, and
an insert of hardened metal wire in the tubular bore and extending along at least part of the length of the tubular bore and being a relatively loose fit therein.

9. A strip according to claim 8, including a plurality of such inserts positioned end to end in the tubular bore at intervals therealong with spacings between their adjacent ends.

* * * * *